(12) United States Patent
Danielsson et al.

(10) Patent No.: US 9,216,443 B2
(45) Date of Patent: Dec. 22, 2015

(54) DRIVE SYSTEM FOR A CLEANING DEVICE AND CLEANING DEVICE

(75) Inventors: Jan Danielsson, Säve (SE); Leon Hjorslev, Greve (DK)

(73) Assignee: ALFA LAVAL CORPORATE AB, Lund (SE)

( * ) Notice: Subject to any disclaimer, the term of this patent is extended or adjusted under 35 U.S.C. 154(b) by 919 days.

(21) Appl. No.: 13/497,317

(22) PCT Filed: Sep. 27, 2010

(86) PCT No.: PCT/SE2010/051035
§ 371 (c)(1),
(2), (4) Date: Apr. 12, 2012

(87) PCT Pub. No.: WO2011/053221
PCT Pub. Date: May 5, 2011

(65) Prior Publication Data
US 2012/0315998 A1    Dec. 13, 2012

(30) Foreign Application Priority Data

Oct. 26, 2009 (SE) .................................. 0950791

(51) Int. Cl.
*H02K 49/06* (2006.01)
*B08B 9/093* (2006.01)

(52) U.S. Cl.
CPC ............ *B08B 9/0936* (2013.01); *H02K 49/065* (2013.01); *Y10T 464/30* (2015.01)

(58) Field of Classification Search
CPC ...................................................... H02K 49/65
See application file for complete search history.

(56) References Cited

U.S. PATENT DOCUMENTS

| 3,822,390 | A  | 7/1974  | Janson          |
| 4,876,471 | A  | 10/1989 | Lacour          |
| 5,238,095 | A  | 8/1993  | Pedu            |
| 5,673,717 | A  | 10/1997 | Jinbäck         |
| 5,751,127 | A  | 5/1998  | Austin et al.   |
| 5,854,429 | A  | 12/1998 | Haudebert et al.|
| 6,043,578 | A  | 3/2000  | Lamb            |
| 6,208,053 | B1 | 3/2001  | Scott           |

(Continued)

FOREIGN PATENT DOCUMENTS

| CN | 1045669 A | 9/1990 |
| CN | 1158190 A | 8/1997 |

(Continued)

OTHER PUBLICATIONS

Translation of the First Office Action mailed by the Japanese Patent Office on Jul. 2, 2013, in the corresponding Japanese Patent Application No. 2012-534141 (3 pages).

(Continued)

*Primary Examiner* — Jason Ko
(74) *Attorney, Agent, or Firm* — Buchanan Ingersoll & Rooney PC (57) ABSTRACT

A drive system (100) for a cleaning device for cleaning a tank (1) including a brake arrangement (7, 8, 13) for regulating the speed of the magnetic hysteresis coupling, and where the brake arrangement is arranged in the vicinity of a second coupling part (5) of the magnetic hysteresis coupling, and where brake arrangement includes brake parts (7, 8, 13) that interacts with the second coupling part of the magnetic hysteresis coupling to adjust the rotation of the second coupling part of the magnetic hysteresis coupling.

21 Claims, 5 Drawing Sheets

(56) References Cited

U.S. PATENT DOCUMENTS

| | | |
|---|---|---|
| 2008/0247861 A1 | 10/2008 | Falster-Hansen |
| 2008/0272205 A1 | 11/2008 | Jorgensen et al. |
| 2009/0320890 A1 | 12/2009 | Jorgensen et al. |

FOREIGN PATENT DOCUMENTS

| | | | |
|---|---|---|---|
| CN | 1976756 A | | 6/2007 |
| CN | 101374610 A | | 2/2009 |
| CN | 101400454 A | | 4/2009 |
| DE | 102 08 989 | | 10/2003 |
| JP | 58-77853 U | | 5/1983 |
| JP | 61-142555 A | | 6/1986 |
| JP | 62277062 A | | 12/1987 |
| JP | 2-299457 A | | 12/1990 |
| JP | 06-086535 | | 3/1994 |
| JP | 8-252552 A | | 10/1996 |
| JP | 9-94547 A | | 4/1997 |
| JP | 3034705 B2 | | 4/2000 |
| JP | 2004-255161 A | | 9/2004 |
| JP | 2006-342874 A | | 12/2006 |
| JP | 2009-522082 A | | 6/2009 |
| KR | 10-2009-0006554 A | | 1/2009 |
| RU | 2011451 C1 | | 4/1994 |
| SU | 827193 A | | 5/1981 |
| WO | 94/28614 A1 | | 12/1994 |
| WO | 2007/076859 | | 7/2007 |
| WO | 2007/076859 A1 | | 7/2007 |

OTHER PUBLICATIONS

Decision on Grant dated Oct. 18, 2013, issued in the corresponding Russian Application No. 2012121912/05 and an English Translation thereof. (11 pgs).

Office Action (Notice of Preliminary Rejection) issued on Sep. 28, 2013 by the Korean Patent Office in corresponding Korean Patent Application No. 10-2012-7007734, and an English Translation of the Office Action. (9 pages).

Written Opinion for International Application No. PCT/SE2010/051035 dated Apr. 11, 2011.

International Search Report for International Application No. PCT/SE2010/051035 dated Apr. 11, 2011.

English language version of Search Report dated Nov. 11, 2013, issued by the Chinese Patent Office in the corresponding Chinese Patent Application No. 201080049433.6. (3 pages).

DRIVE SYSTEM FOR A CLEANING DEVICE AND CLEANING DEVICE

AREA OF INVENTION

The present invention relates to a cleaning device, in particular a drive arrangement for a cleaning device for cleaning the interior of a tank.

BACKGROUND OF INVENTION

This kind of cleaning devices are used for cleaning the interior of tanks and includes a drive system comprising a housing with a turbine mounted in a liquid channel to which cleaning liquid is supplied under pressure, as well as a gear which is driven by the turbine, and which is mounted separated from the cleaning liquid in the housing as a safeguard against leakage of cleaning liquid. The gear transfers the rotation produced by the turbine to a reduced rotation of a cleaning head in the tank. The rotation produced by the turbine is transferred to the gear via a magnetic coupling having coupling parts, the one coupling part of which being disposed inside the housing in the liquid channel and the other coupling part of which being disposed outside the housing, and wherein the coupling parts are mutually parallel discs.

The cleaning head includes a housing and a hub mounted thereon, and where the hub is provided with nozzles. The cleaning liquid being conveyed from the turbine and to the nozzles in operation, where the housing are mounted on a stationary mounting part so that the liquid from the turbine bypasses the housing and flows to the nozzles. The rotation of the turbine is transferred to the input shaft of the gear by means of a magnetic coupling having coupling parts, e.g. a hysteresis coupling, the driving coupling part of which being disposed outside the gear housing, and the driven coupling part of which being disposed inside the gear housing.

Jets of cleaning liquid are jets ejected by means of nozzles and pressurized liquid will clean the tank in an effective manner by their combined turning and rotation.

Examples of this kind of cleaning devices for tank cleaning are known from WO-A1-2007/076859, which describes a tank cleaning machine having a drive system comprising a hysteresis coupling having two magnetic parts formed by electromagnets, which magnetic parts are present inside the liquid space and outside this, respectively, a completely liquid-tight separation between the housing and the gear may be ensured. The magnetic part of the hysteresis coupling have a displaceable position of the one part relative to the other part the coupling may be adjusted with respect to the transferred torque and/or speed One problem with the above tank cleaning devices having a hysteresis coupling is that when you adjust the speed on the hysteresis coupling by increasing or decreasing the space between the magnet parts and hysteresis plate or disc, the hysteresis torque will decrease when you increase the space between magnets and hysteresis plate.

DISCLOSURE OF INVENTION

The object of the present invention is to provide a drive system for a cleaning device for cleaning the interior of a tank that overcomes the problem with the torque transfer from a turbine of the drive system to a shaft connected to a cleaning head of the cleaning device when using a hysteresis coupling to transfer the rotation of the turbine of the drive system to the shaft connected to the cleaning head.

The objective is achieved by a driving system for a cleaning device for cleaning a tank, the drive system comprising a driving arrangement is provided to rotate a input shaft connected to a gear box, where the gear box transfers rotation of the driving arrangement to a reduced rotation of a cleaning head in the tank where the input shaft is provided with a first coupling part is one end having a disc shape, and where the drive system is further equipped with a brake arrangement for regulating the speed of the driving arrangement, and where the brake arrangement is arranged in the vicinity of the first coupling part, and that the brake arrangement includes brake parts that interacts with the first coupling part of the driving arrangement to adjust the rotation of the first coupling part by changing the distance of the brake parts relative to the first coupling part.

According to a first aspect of the claimed invention the different parts of the brake arrangement are integrated with the different parts of the hysteresis coupling and located to match the set-up of the hysteresis coupling. The brake arrangement can be formed by at least one magnet located on the first coupling part of the driving arrangement and hysteresis part arranged in the vicinity of the at least one magnet. The at least one magnet of the brake arrangement is arranged substantially along the periphery of the first coupling part of the driving arrangement, and where the brake force is applied by either axially or radially, or by both axially and radially moving the hysteresis part of the brake arrangement relative to the at least one magnet.

According to a second aspect of the claimed invention the brake arrangement is formed by at least one magnet located on a brake magnet holder, which is arranged in the vicinity of a peripheral end of the first coupling part of the driving arrangement and where the first coupling part of the driving arrangement composes a hysteresis part of the brake arrangement. The brake force of the brake arrangement is applied by either axially or radially, or by both axially and radially moving the brake magnet holder and the at least one magnet mounted thereon relative to the first coupling part (5) of the hysteresis coupling composing as hysteresis part.

The mutual position of the magnetic part and the hysteresis part may be selected freely in dependence on the conditions, so that the one part may be placed either "dry" in the gear box or in the liquid flow in the housing According to a further aspect of the claimed invention the brake arrangement is arranged inside the gear box outside the liquid flow.

According to a yet further aspect of the claimed invention the hysteresis part of the brake arrangement or hysteresis coupling are made of a ferro-magnetic hysteresis material.

According to a still further aspect of the claimed invention the magnetic part of the brake arrangement or hysteresis coupling is provided with a plurality of permanent magnets for generating the necessary magnetic field strength and polarity.

According to another aspect of the claimed invention the magnetic part is provided with electromagnetic magnets for variable adjustment of the magnetic field strength instead of moving the hysteresis part or the magnet part.

The drive system will operate in a housing of a non-magnetic material, such as stainless steel, which is a preferred material for use in connection with cleaning device of this type. The drive system is maintenance-free and will therefore not require any form of service.

The drive system of above can be an integrated part of a cleaning device for cleaning the interior of a tank The gap between the brake parts may be varied, it is possible to adjust the energy content in the gap and thereby the magnetic forces between the brake parts, whereby the brake force may be adjusted to the speed.

According to a further aspect of the claimed invention the driving arrangement of the drive system can be formed as an electric motor unit arranged inside the gear box. The driving arrangement can also be formed to include a magnetic coupling having a first magnet coupling part being housed inside the gear box connected to the input shaft and a second magnetic coupling part disposed in a housing, and where the second magnetic coupling part comprises a turbine mounted in a liquid channel to which cleaning liquid is supplied under pressure and which cleaning liquid rotates the turbine, and where the rotation of the turbine is transferred to the gear box via the magnetic coupling formed by the first magnetic coupling part and the second magnetic coupling part, and where the gear box is mounted separated from the cleaning liquid in the housing. The driving arrangement can further be formed to include a magnetic hysteresis coupling comprising a first coupling part being arranged inside the gear box and a second coupling part mounted in a housing, where the second coupling part includes a turbine mounted in a liquid channel to which cleaning liquid is supplied under pressure and which cleaning liquid rotates the turbine and where the rotation of the turbine is transferred to the gear box via the magnetic hysteresis coupling formed by the first coupling part and the second coupling part as mutually parallel discs, where input shaft is connected first coupling part, and the turbine connected to the second coupling part, and where the gear box is mounted separated from the cleaning liquid in the housing.

Further aspects of the invention is apparent from the dependent claims and the description

BRIEF DESCRIPTION OF THE DRAWINGS

Further objects, features and advantages will appear from the following detailed description of several embodiments of the invention with reference to the drawings, in which.

DETAILED DESCRIPTION OF EMBODIMENTS

Figure 1:
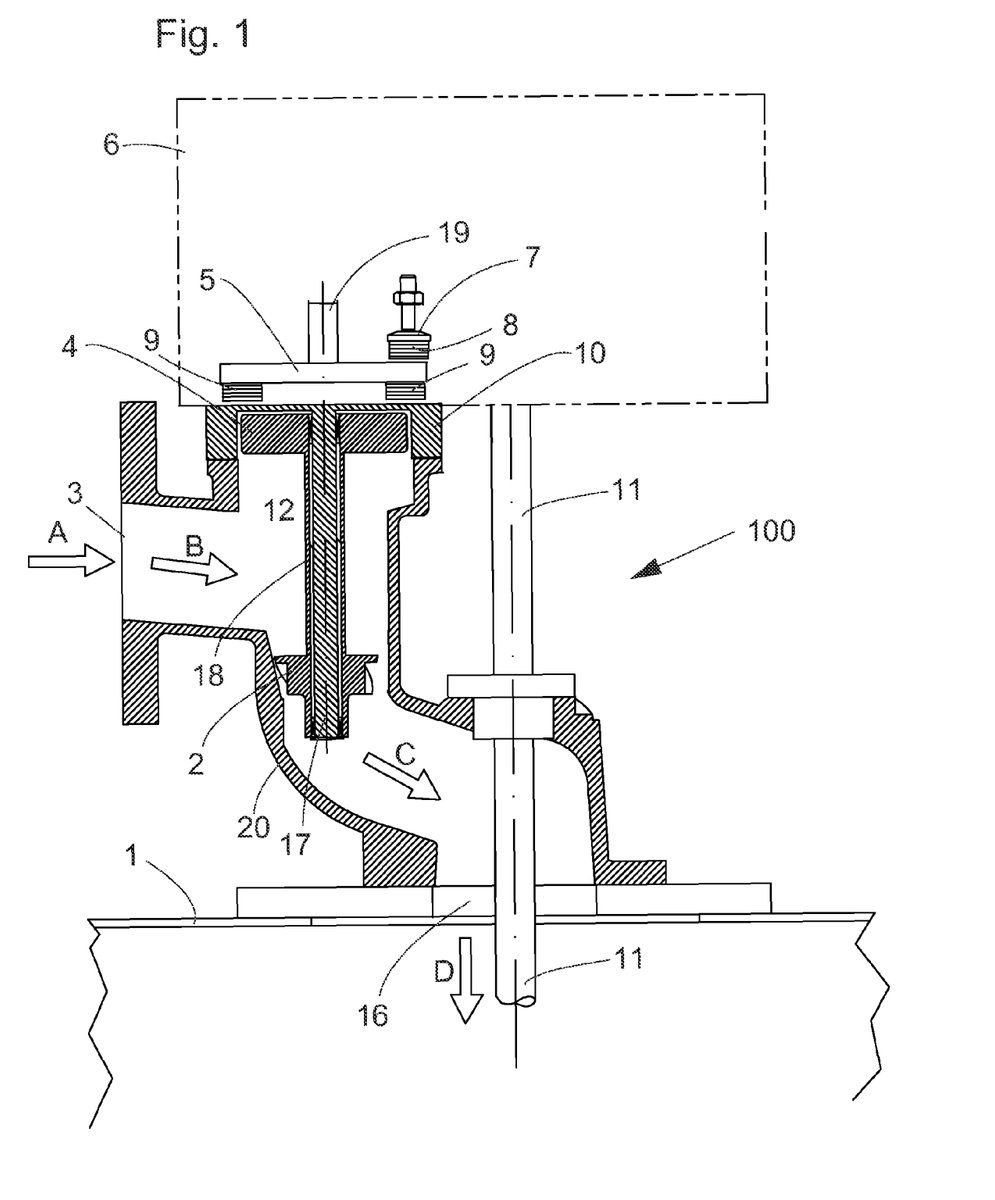
FIG. 1 shows cross sectional views of a first embodiment of a cleaning device having a brake arrangement according to the invention.
Figure 2:
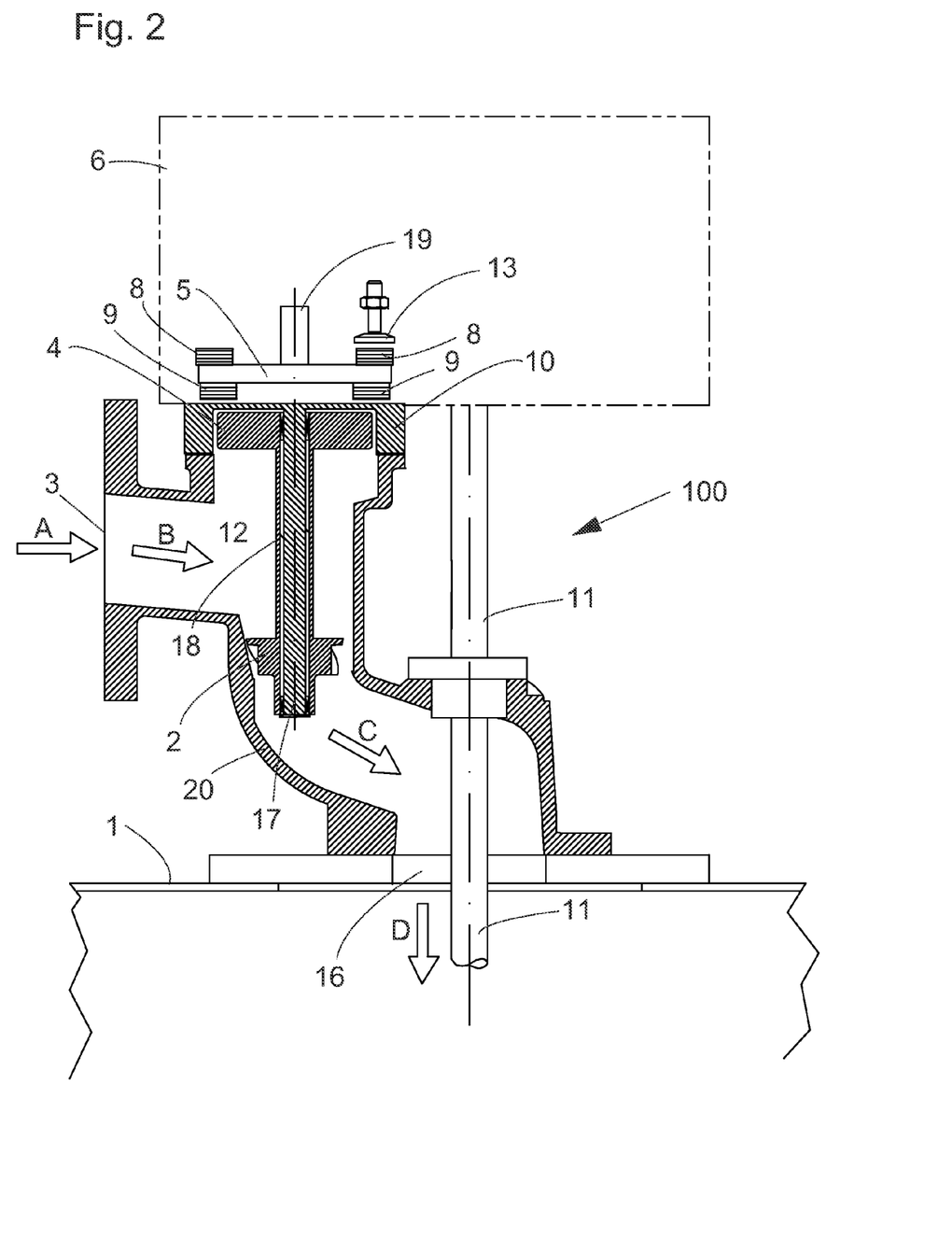
FIG. 2 shows cross sectional views of a first embodiment of a cleaning device having an alternative brake arrangement according to the invention.

FIGS. 1-2 disclose a drive system 100 for a tank cleaning apparatus, where the tank cleaning apparatus is attached to tank to be cleaned. The tank is only partially shown in FIGS. 1-4 with the deck 1 of the tank. The tank cleaning apparatus also includes a pipe (not shown) connected to a liquid outlet 16 and a cleaning head (not shown) connected to the pipe, where the cleaning head is present down in the tank. The cleaning head is rotatable by means of a rotary shaft 11, and it is also provided with rotating nozzles on a hub to eject the cleaning liquid under pressure and thereby cleaning the entire internal surface of the tank.

The drive system 100 comprises a housing 20 with a liquid inlet 3 for supplying cleaning liquid to the tank cleaning apparatus. The cleaning liquid is supplied under pressure and the flow direction of the cleaning liquid through the drive system 100 is shown by the arrows A-D. Between the liquid inlet 3 and the liquid outlet 16 is formed a flow area 12, wherein a turbine 2 is arranged. The turbine 2, which is rotated with a speed of rotation of several thousand revolutions per minute by the liquid flowing, is rotatably hinged on a shaft 17, the shaft 17 being arranged on the housing 20 via a turbine cover 10. The turbine 2 is connected cylinder-shaped part 18, where the cylinder-shaped 18 extends around and along the shaft 17 and is connected to a magnetic hysteresis plate 4 in the opposite end of the shaft 17. The rotation of the turbine 2 is transferred via the cylinder-shaped part 18 to the hysteresis plate 4 located in an upper part of the housing 20.

Since the rotation of the cleaning head takes place at low revolutions, a gear must be interposed between the turbine 2 and the rotary shaft 11.

This gear is housed a gear box 6, which is mounted on top of the housing 20, where the gear box 6 is schematically indicated by a dotted line. The gear box 6 includes an input shaft 19 and an output shaft 11, a connecting arrangement (not shown) between the shaft 11, 19, and the output shaft 11 having a reduced speed of rotation.

As discussed above the housing 20 with the gear box 6 is mounted externally on the tank.

There is no connection between the turbine 2 mounted in the flow area 12 and the driven magnetic plate 4 in that the housing 20 is completely closed off as a safeguard against leakage at the turbine cover 10.

The turbine 2 is, as stated above, rotatably arranged on the shaft 17 and connected the disc-shaped magnetic hysteresis plate 4 via cylinder-shaped part 18. The magnetic hysteresis plate 4 is provided with a plurality of permanent magnets. These magnets produce a magnetic field, and alternatively a few magnets having a great polarizing face of e.g. the AlNiCo magnetic type may be used, or a large number of small permanent magnets having a great magnetic force and small surface areas may be selected.

Instead of the permanent magnets, electromagnets may be mounted, which have the advantage that the strength of the magnetic field may be varied continuously by changing the voltage. This provides for the option of a variable adjustability of the torque and/or the speed which is to be transferred via the coupling.

Another magnetic hysteresis part 5 is arranged on the outer side of the turbine cover 10, where the hysteresis part 5 is formed as a disc and extends in parallel with the disc-shaped magnetic hysteresis plate 4 and such that they are both rotatable about the same axis of rotation. The hysteresis part 5 is provided with hysteresis magnets 9 that together with the hysteresis plate 4 form the hysteresis coupling. The hysteresis magnets 9 are preferably made of a magnetic material containing metal oxides, such as Fe 203 powder which is electrically insulated. This material has a high isotropic electrical resistance which effectively prevents the generation of eddy currents in the hysteresis part. Further, the magnetic properties are good, even at relatively high temperatures. It is also possible to use a laminated material having layers of a ferromagnetic hysteresis material, which is insulated from each other by means of dielectric films.

The functionality and the structure of the hysteresis coupling is such that the coupling transfers a torque generated by the turbine 2 to the input shaft 19 of the gear box 6 in a manner which comprises parts that are separated from each other by means of an air gap and a cover.

The hysteresis coupling and thereby the torque can be adjusted by moving the magnet disc 5 and the hysteresis magnets 9 in an axial direction relative to the hysteresis plate 4.

Finally, the drive system 100 may be extended with a further magnetic hysteresis coupling to transfer the rotary movement of the gear to the rotary shaft 11 of the cleaning head. Total liquid separation between the liquid in the housing 20 and the gear box 6 may be achieved hereby, as the housing 20 is thus closed completely and thereby protected against leakage of liquid, caused e.g. by wear of the shaft seals.

In the above it is assumed that permanent magnets are used, but it is also possible to use electromagnets instead.

To further regulate the speed of the coupling the magnet disc 5 is provided with a brake arrangement. In FIG. 1 the brake arrangement is shown as brake magnet holder 7 holding one or more brake magnets 8, and where the brake arrangement is located above and at a distance from the magnet disc 5 and at one peripheral end of the magnet disc 5. By moving the brake magnets 8 axially relatively to the magnet disc 5 the speed of the hysteresis coupling can be adjusted. In this arrangement the magnet disc 5 is axially fixedly arranged. The speed can also be adjusted by moving the brake magnets 8 radially towards/away from the rotational axis of the magnetic disc 5, or by a combined radial and axial movement of the brake magnets 8 relative to the magnetic disc 5.

Alternatively one or several brake magnets 8 are arranged along the peripheral area of the magnet disc 5 (see FIG. 2) having a brake hysteresis plate 13 arranged at distance above the brake magnets 8. By moving the brake hysteresis plate 13 axially relatively to the brake magnets 8 on the magnet disc 5 the speed of the hysteresis coupling can be adjusted. In analogy with the embodiment of FIG. 1 the speed can also be adjusted by a radial movement or combined radial and axial movement of the brake hysteresis plate 13 relative to the brake magnets 8 on the magnet disc 5.

Figure 3:
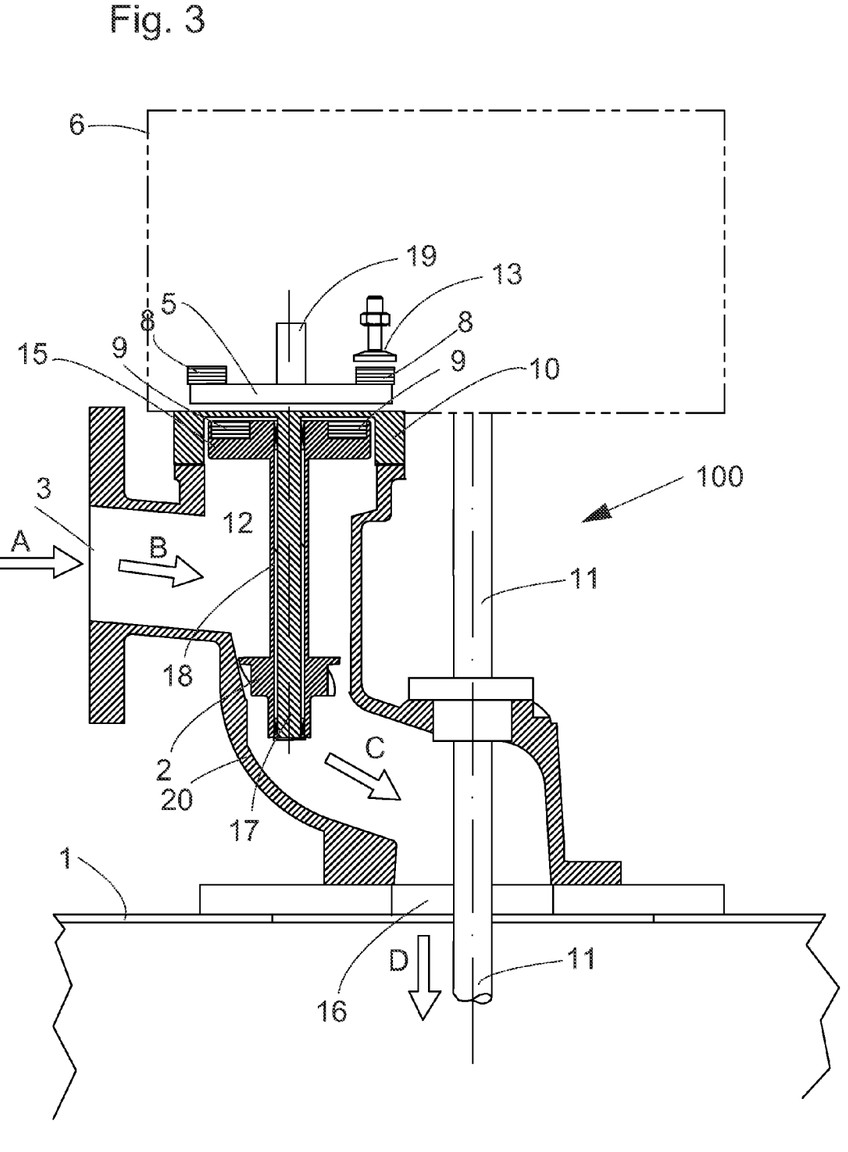
FIG. 3 shows cross sectional views of a second embodiment of a cleaning device having an alternative brake arrangement according to the invention.

In FIG. 3 an alternative embodiment of the hysteresis coupling is shown, where the hysteresis magnets 9 are arranged in flow area 12 and on a magnet disc 15. The magnet disc 15 corresponds to the disc-shaped magnetic hysteresis plate 4 of FIGS. 1-2 and is rotating together with the turbine 2 to which it is connected via the cylinder-shaped part 18. The brake arrangement of the embodiment in FIG. 3 corresponds to the alternative brake arrangement of FIG. 2, where one or more brake magnets 8 are arranged along the peripheral area of the magnet disc 5 (see FIG. 2) having a brake hysteresis plate 13 arranged at distance above the brake magnets 8. By moving the brake hysteresis plate 13 axially relatively to the brake magnets 8 on the magnet disc 5 the speed of the hysteresis coupling can be adjusted. In analogy with the embodiment of FIG. 2 the speed can also be adjusted by a radial movement or combined radial and axial movement of the brake hysteresis plate 13 relative to the brake magnets 8 on the magnet disc 5.

Figure 4:
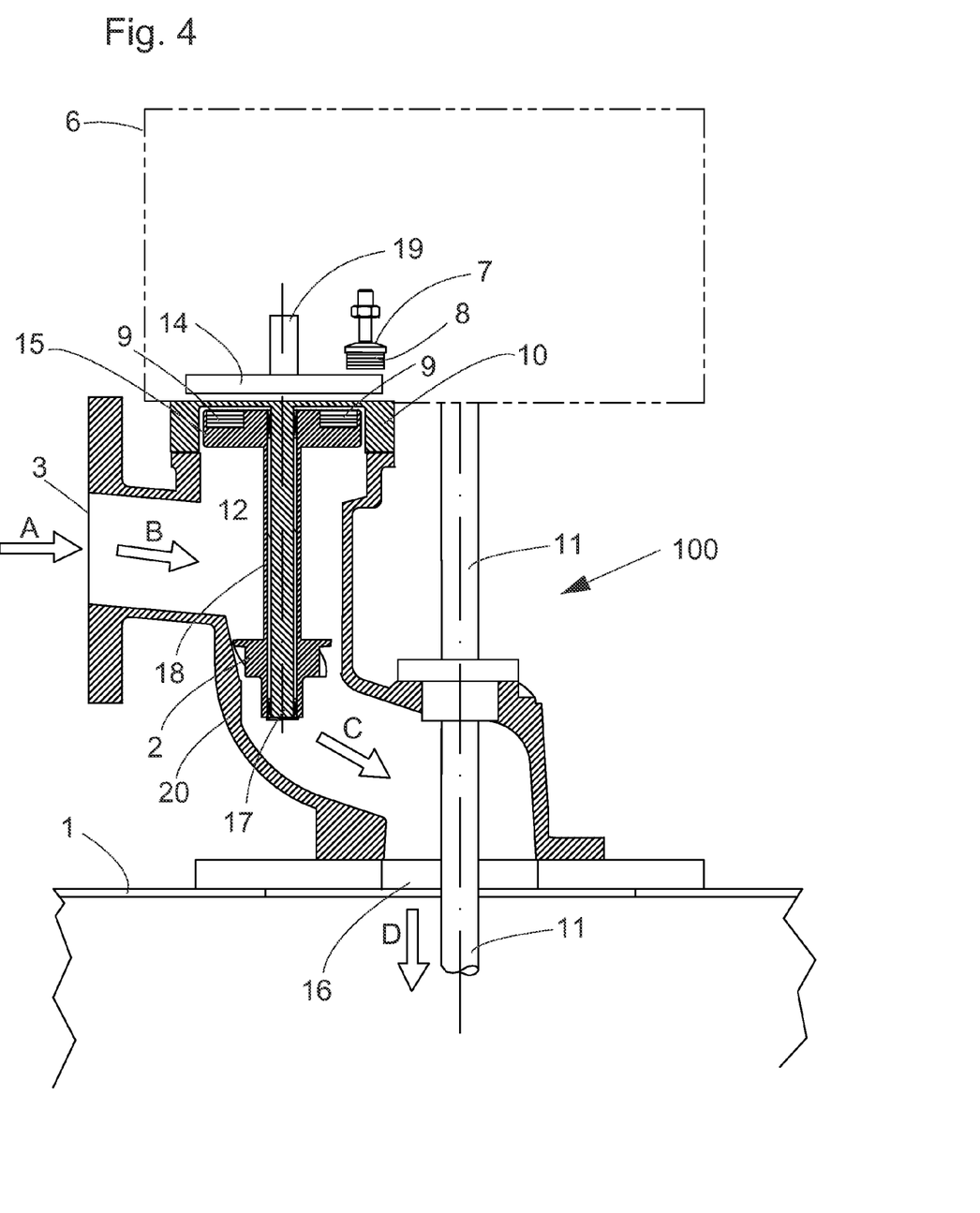
FIG. 4 shows cross sectional views of a second embodiment of a cleaning device having a brake arrangement according to the invention.

In FIG. 4 an alternative embodiment of the hysteresis coupling is shown corresponding to the embodiment of FIG. 3, where the hysteresis magnets 9 of the hysteresis coupling are arranged in flow area 12 and on the magnet disc 15. The magnet disc 15 corresponds to the disc-shaped magnetic hysteresis plate 4 of FIGS. 1-2 and is rotating together with the turbine 2 to which it is connected the via cylinder-shaped part 18. The brake arrangement of the embodiment in FIG. 4 corresponds partially to the brake arrangement of FIG. 1, where one or more brake magnets 8 on a brake magnet holder 7, which is arranged at one peripheral end of a magnetic hysteresis coupling and brake disc 14. By moving the brake magnet 8 axially relatively to the hysteresis coupling and brake disc 14 the speed of the hysteresis coupling can be adjusted. In analogy with the embodiment of FIG. 1 the speed can also be adjusted by a radial movement or combined radial and axial movement of the brake magnets 8 radially relative to the hysteresis brake disc 14.

In the brake arrangement of FIGS. 1 and 4 only one brake magnet 8 and brake magnet holder 7 are shown, but there can also be several brake magnets 8 and corresponding number of brake magnet holders 7. In the above it is assumed that permanent magnets are used, but it is also possible to use electromagnets instead.

Below the brake arrangement functionality of the embodiment shown in FIG. 1 is described.

When the cleaning liquid is supplied via the liquid inlet 3 and flowing in the direction A, B, C and D, the liquid passes the flow area 12 where the turbine 2 is arranged and where the liquid flow rotates the turbine 2. The rotation of the turbine 2 is transferred via the cylinder-shaped part 18 to the hysteresis plate 4 forming a first part of the hysteresis coupling located in an upper part of the housing 20. The magnetic disc 5 forming the other part of the hysteresis coupling, which is arranged on the outer side of the turbine cover 10, is rotated at lower rotational speed than the hysteresis plate 4 due to the slip functionality of the hysteresis coupling. To adjust the speed of the magnetic disc 5 and the input shaft 19 of the gear box 6 connected magnetic disc 5 the brake magnet 8 is moved axially closer to the magnetic disc 5 to reduce the speed of the magnetic disc 5 and moved axially away from the magnetic disc 5 to increase the speed of the magnetic disc 5.

In FIG. 2 the brake magnet is arranged on the magnetic disc 5 and the adjustment of the speed of the magnetic disc 5 and the input shaft 19 of the gear box 6 connected magnetic disc 5 is achieved by moving the brake hysteresis plate 13 axially closer to the magnetic disc 5 to reduce the speed of the magnetic disc 5 and moving the brake hysteresis plate 13 axially away from the magnetic disc 5 to increase the speed of the magnetic disc 5.

In the embodiment of FIG. 3 the adjustment of the speed of the magnetic disc 5 is achieved in a similar way as described for the embodiment of FIG. 2. In the embodiment of FIG. 4 the adjustment of the speed of the magnetic disc 5 is achieved in a similar way as described for the embodiment of FIG. 1.

The maximum torque of the hysteresis coupling, i.e. between the magnets and the hysteresis plate, is achieved by having a minimum distance between the magnets and the hysteresis plate and by not adjusting the space between the magnets and the hysteresis plate. The speed should instead be adjusted, as described above, by increasing or decreasing the gap between one or more brake magnets and a magnet carrier, the magnet carrier being the hysteresis plate of the hysteresis coupling or a magnet disc of the hysteresis coupling.

Figure 5:
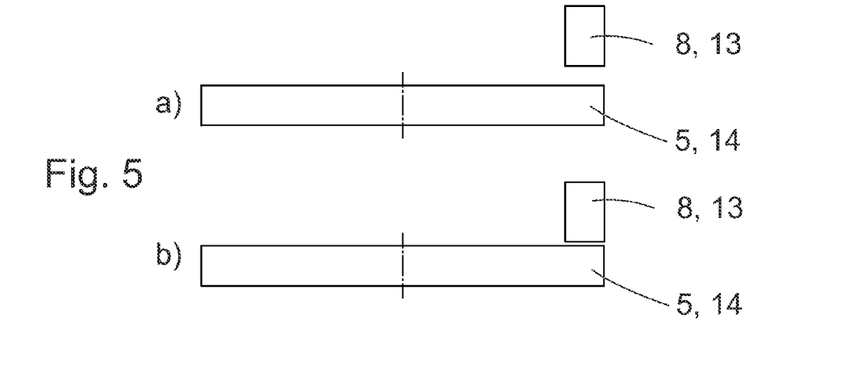
FIGS. 5, 6 and 7 show the principle movement of a brake arrangement according to the invention to regulate the speed.
Figure 6:
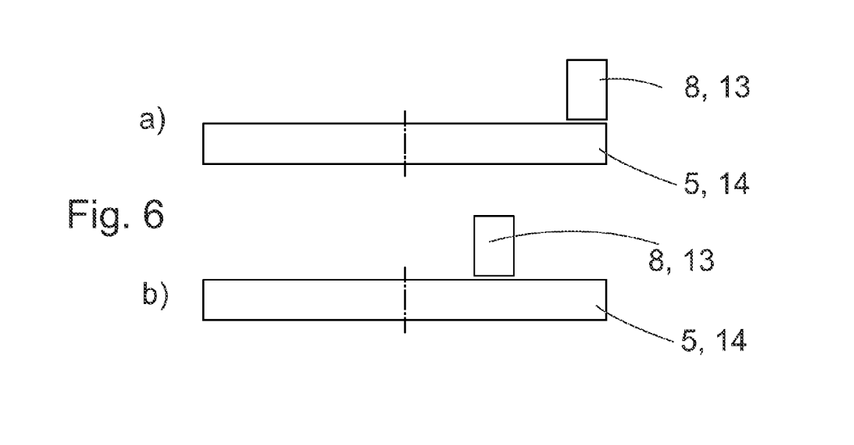
Figure 7:
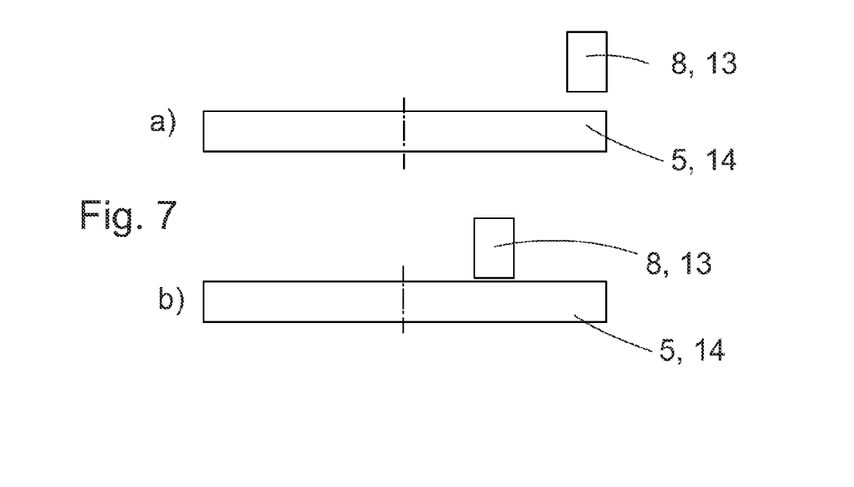

In the above description of the functionality of the brake arrangement it has been described that the brake hysteresis plate and the brake magnet holder, respectively, are moved axially relative to the coupling plate (see FIG. 5, where a) shows a first position and b) shows a second position), but it is also possible to regulate the brake force by changing the circumference diameter of the brake hysteresis plate and the brake magnet holder, respectively, relative to the coupling plate (see FIG. 6). It is also possible to use a combination of axial and radial movement of the brake hysteresis plate and the brake magnet holder, respectively, relative to the coupling plate to regulate the brake force (see FIG. 7).

It has been assumed that hysteresis coupling are used, but it is also possible to combine the hysteresis brake with magnetic coupling. The magnetic coupling comprises two magnets, upper/lower magnetic body or inner/outer magnetic body, compared with the hysteresis coupling which comprises en magnetic inductor provided with a number of permanent magnets or electro-magnets. The permanent magnets or electro-magnets co-operate with a hysteresis plate to create the hysteresis coupling. The hysteresis plate is made of a ferro-magnetic material that is magnetized by the magnets of the magnetic inductor and the magnetic hysteresis coupling is established.

Yet another alternative driving arrangement is replace the turbine arrangement and the hysteresis coupling respective the magnetic coupling with an electric motor (not shown) that rotates the input shaft 19. The electric motor is arranged inside or outside the gear box 6. The hysteresis brake arrangement serves to reduce the speed of the electric motor, which is attractive since a very simple and low cost electric motor only operating at one speed can be used instead of a more advanced and expensive electric motor with a variable motor speed.

The brake force of the hysteresis brake is normally set when installing the cleaning device in its operational location to enable the optimal rotation of the cleaning head inside the tank. As shown in the drawings it is assumed that the brake force is inside the gear box, but is possible to enable adjustment of the brake of the hysteresis brake from the outside.

The invention is not limited to the embodiments described above and shown on the drawings, but can be supplemented and modified in any manner within the scope of the invention as defined by the enclosed claims.

REFERENCES OF THE DRAWINGS

1 Deck
2 Turbine
3 Liquid inlet
4 Hysteresis plate
5 Magnet disc
6 Gear box
7 Brake magnet holder
8 Brake magnet
9 Magnet for hysteresis
10 Turbine cover
11 Shaft to cleaner head
12 Flow area
13 Brake hysteresis
14 Hysteresis coupling and brake
15 Magnet disc in flow area
16 Liquid outlet
17 Shaft
18 Cylinder-shaped part
19 input shaft
20 Housing
A Flow direction
B Flow direction
C Flow direction
D Flow direction

The invention claimed is:

1. A drive system for a cleaning device for cleaning a tank, the drive system comprising a driving arrangement provided to rotate an input shaft connected to a gear box, wherein the gear box transfers rotation of the driving arrangement to a reduced rotation of a cleaning head in the tank, and wherein the input shaft is provided with a first coupling part in one end having a disc shape, the drive system is further equipped with a brake arrangement for regulating the speed of the driving arrangement, and the brake arrangement is comprised of a hysteresis part constituted by the first coupling part and at least one magnet held on a brake magnet holder, the brake magnet holder together with the at least one magnet and the coupling part being relatively movable to change a distance between the least one magnet and the coupling part, the brake magnet holder being positioned to arrange the at least one magnet in the vicinity of the first coupling part so that the at least one magnet interacts with the first coupling part of the driving arrangement to adjust the rotation of the first coupling part by changing the distance of the at least one magnet relative to the first coupling part.

2. The drive system according to claim 1, wherein a braking force of the brake arrangement is applied by either axially or radially, or by both axially and radially, moving the brake magnet holder and the at least one magnet mounted thereon relative to the first coupling part of the driving arrangement.

3. The drive system according to claim 1, wherein the brake arrangement is arranged inside the gear box.

4. The drive system according to claim 1, wherein the driving arrangement is an electric motor unit arranged inside the gear box.

5. The drive system according to any one of claims 1, 2 and 3, wherein the driving arrangement includes a magnetic coupling having a first magnet coupling part housed inside the gear box connected to the input shaft and a second magnetic coupling part disposed in a housing, and wherein the second magnetic coupling part comprises a turbine mounted in a liquid channel to which cleaning liquid is supplied under pressure and wherein the cleaning liquid rotates the turbine, and the rotation of the turbine is transferred to the gear box via the magnetic coupling formed by the first magnetic coupling part and the second magnetic coupling part, and wherein the gear box is mounted separated from the cleaning liquid in the housing.

6. The drive system according to any one of claims 1, 2 and 3, wherein the driving arrangement includes a magnetic hysteresis coupling comprising the first coupling part being arranged inside the gear box and a second coupling part mounted in a housing, wherein the second coupling part includes a turbine mounted in a liquid channel to which cleaning liquid is supplied under pressure and wherein the cleaning liquid rotates the turbine and the rotation of the turbine is transferred to the gear box via the magnetic hysteresis coupling formed by the first coupling part and the second coupling part as mutually parallel discs, and wherein the turbine is connected to the second coupling part, and where the gear box is mounted separated from the cleaning liquid in the housing.

7. The drive system according to claim 1, wherein the hysteresis part of the brake arrangement is made of a magnetic hysteresis material.

8. The drive system according to claim 1, wherein the at least one magnet includes a plurality of permanent magnets for generating necessary magnetic field strength and polarity.

9. The drive system according to claim 1, wherein the at least one magnet includes electromagnetic magnets for variable adjustment of magnetic field strength.

10. A cleaning device for cleaning a tank which includes the drive system according to any one of claims 1 and 2 to 4.

11. A drive system for a cleaning device for cleaning a tank, the drive system comprising a driving arrangement provided to rotate an input shaft connected to a gear box, wherein the gear box transfers rotation of the driving arrangement to a reduced rotation of a cleaning head in the tank, and wherein one end of the input shaft is provided with a rotatable disc-shaped first coupling part, the drive system is further equipped with a brake arrangement for regulating the speed of the driving arrangement by applying a braking force, the brake arrangement being comprised of at least one magnet mounted on the first coupling part of the driving arrangement and a brake hysteresis part arranged in the vicinity of the at least one magnet, the at least one magnet and the brake hysteresis part being relatively movable to change a distance between the at least one magnet and the brake hysteresis part, and the brake hysteresis part interacting with the at least one magnet mounted on the first coupling part to adjust the rotation of the first coupling part by changing the distance between the brake hysteresis part and the at least one magnet mounted on the first coupling part.

12. The drive system according to claim 11, wherein the at least one magnet is arranged substantially along the periphery of the first coupling part of the driving arrangement, and a braking force is applied by either axially or radially, or by both axially and radially, moving the brake hysteresis part relative to the at least one magnet.

13. The drive system according to claim 11, wherein the braking force of the brake arrangement is applied either by either axially or radially moving, or by both axially and radially moving, the brake magnet holder and the at least one magnet mounted thereon relative to the first coupling part of the driving arrangement comprising the hysteresis part.

14. The drive system according to claim 11, wherein the brake arrangement is arranged inside the gear box.

15. The drive system according to claim 11, wherein the driving arrangement is an electric motor unit arranged inside the gear box.

16. The drive system according to any one of claims 11-15, wherein the driving arrangement includes a magnetic coupling having a first magnet coupling part housed inside the gear box connected to the input shaft and a second magnetic coupling part disposed in a housing, and wherein the second magnetic coupling part comprises a turbine mounted in a liquid channel to which cleaning liquid is supplied under pressure and wherein the cleaning liquid rotates the turbine, and the rotation of the turbine is transferred to the gear box via the magnetic coupling formed by the first magnetic coupling part and the second magnetic coupling part, and wherein the gear box is mounted separated from the cleaning liquid in the housing.

17. The drive system according to any one of claims 11-15, wherein the driving arrangement includes a magnetic hysteresis coupling comprising the first coupling part being arranged inside the gear box and a second coupling part mounted in a housing, wherein the second coupling part includes a turbine mounted in a liquid channel to which cleaning liquid is supplied under pressure and wherein the cleaning liquid rotates the turbine and the rotation of the turbine is transferred to the gear box via the magnetic hysteresis coupling formed by the first coupling part and the second coupling part as mutually parallel discs, and wherein an input shaft is connected to the first coupling part, and the turbine is connected to the second coupling part, and where the gear box is mounted separated from the cleaning liquid in the housing.

18. The drive system according to claim 11, wherein the brake hysteresis part of the brake arrangement is made of a magnetic hysteresis material.

19. The drive system according to any one of claims 11-15, wherein the at least one magnet includes a plurality of permanent magnets for generating necessary magnetic field strength and polarity.

20. The drive system according to claim 11, wherein the at least one magnet includes electromagnetic magnets for variable adjustment of magnetic field strength.

21. A cleaning device for cleaning a tank which includes the drive system according to any one of claims 11-15.

* * * * *